Patented Dec. 1, 1953

2,661,309

UNITED STATES PATENT OFFICE 2,661,309

COATED PAPER AND METHOD OF PRODUCING SAME

Julian L. Azorlosa, Wilmington, Del., assignor to Hercules Powder Company, Wilmington, Del., a corporation of Delaware No Drawing. Application November 18, 1948, Serial No. 60,827

11 Claims. (Cl. 117—62)

This invention relates to a coated paper and to a composition of matter and process useful therefor.

In the preparation of a coated paper, it is conventional to prepare a mixture of water and a pigment such as clay or the like, optionally together with other materials such as, for example, a soluble pyrophosphate which may act as a dispersing and stabilizing agent. This mixture, otherwise known as a pigment slip or, since it generally contains clay, as a clay slip, is then compounded with a binder or adhesive material to produce a composition known in the art as a coating color which is useful for coating a cellulose web. Considerable quantities of the binder are used, and, accordingly, the composition and characteristics of the binder are of great importance in determining the qualities of the finished paper. Important properties of the binder are that they must impart to the coating color or to the finished paper a high degree of brightness, smoothness and gloss, and a good finish and feel after calendering. In addition to these basic qualities required in coatings, there are various further characteristics that go far toward determining the value and utility of coating adhesives: (1) the coating color must flow smoothly and evenly so that it may be applied to paper at sufficiently high speeds to be economical in ordinary coating processes; (2) the coating must have high strength, to permit subsequent printing on the coated paper without "picking"; and (3) the coating must have a high wet-rub resistance for uses wherein the coated paper is treated with water as, for example, in off-set printing. It has previously been difficult to find a satisfactory adhesive or binder which is favorably adapted for these critical needs and which, at the same time, is economically available.

Now in accordance with the present invention, there is utilized as a coating adhesive a composition of matter comprising a copolymer prepared from a significant but minor proportion of acrylic acid together with a major proportion of a nonacidic, copolymerizable compound such as, preferably, acrylamide. In operating according to this invention, a coating adhesive is prepared by mixing a clay or pigment in aqueous suspension with the copolymer to yield a coating color which is thereafter applied to a paper web or the like. According to a preferred embodiment of the invention, the copolymer is prepared from between about 3 and about 30% and preferably between about 6 and about 10% acrylic acid copolymerized with the remaining percentage of acrylamide and the coating color prepared therefrom is applied to paper and treated with an insolubilizing agent such as, for example, a metallic salt which acts on the free carboxyl groups of the copolymer to yield a high water-insoluble coating.

The general nature of the invention having been set forth hereinbefore, the following examples are now presented in illustration, but not in limitation thereof.

EXAMPLE 1

A solution of 54 parts of acrylamide and 6 parts of acrylic acid in 500 parts of dioxan was refluxed for 30 minutes in the presence of 0.25 part of benzoyl peroxide. At the end of this refluxing period a copolymer of acrylamide and acrylic acid had been precipitated and was collected on a filter. The product was washed with diethyl ether and dried in vacuo (50° C. at 20 mm.) and was a fine, dry, light-colored powder.

A 72% solids clay slip was prepared by mixing 100 parts of pulverized clay with the required quantity of water, and 0.5% sodium pyrophosphate, based on the clay, was added. Nine parts of the copolymer was dissolved in a small quantity of water and the thus prepared solution was added to the clay slip. Water was added to bring the resulting mixture, or coating color, to a solids content of 62.4%, and the mixture was stirred for a few minutes and passed through a 60-mesh screen to insure the absence of undispersed clay agglomerates. The screened coating color was then coated on bleached sulfite waterleaf sheets and the coated sheets were air dried at room temperature. Test sheets were selected from the air-dried coated paper and were conditioned for two days at 23° to 24° C. at 50% relative humidity to yield in each case a test sheet which was tested according to standard Dennison wax tests in comparison with a control sheet containing 20% starch as the binder. The results of these tests are shown in the table.

The coated paper resulting from the procedure of this example was characterized by excellent color, brightness, and finish and had good printing properties as indicated by satisfactory Dennison wax test.

EXAMPLE 2

The procedure of Example 1 was followed to yield a paper having thereon a coating color having as its adhesive binder an acrylic acid-acrylamide copolymer and, before drying, the coated sheet was dipped in a 1% aqueous alum solution and the dipped sheets were pressed and air dried at room temperature. These alum-dipped sheets were then conditioned for 48 hours at 23° to 24° C. and 50% relative humidity. In addition to excellent color, brightness, and finish the resulting sheets were characterized by a further improved Dennison wax test.

A rough but adequate test of the wet-rub resistance of the coated paper was utilized to test the coated sheets in comparison with control coated sheets using 20% starch as the coating color adhesive. According to this rough test, the operator moistened a suitable test surface with water and rubbed this surface across the coated side of the paper and then placed the test surface against a piece of black paper. The amount of coating color which was rubbed off the paper onto the test surface and subsequently transferred to the black paper was a qualitative indication of the wet-rub resistance of the paper and indicated adequately whether the wet-rub resistance of the paper could be classified as poor, fair, good or excellent. The results of this wet-rub test as well as the Dennison wax test as applied to the coated paper of this example are shown in the table.

EXAMPLE 3

The procedure of Example 1 was repeated to prepare a fine, dry copolymer powder having comonomer proportions of 42 parts acrylamide and 8 parts acrylic acid, thus corresponding to a copolymer prepared from acrylic acid and 84% acrylamide. The procedure of the previous example was followed to prepare a clay coating color containing 0.5% sodium pyrophosphate, 54% total solids, and having present 7% copolymer based on the total solids of the composition. This coating color was applied to paper according to the procedure of Examples 1 and 2, yielding coated papers characterized by excellent brightness, color, finish, and the like, and characterized by unusually good adhesive strength. The coated papers were conditioned and tested according to the procedures of the previous examples with test results as set forth in the table.

EXAMPLE 4

The procedures of Examples 1 and 2 were repeated utilizing a clay coating color containing 11% copolymer based on the weight of clay, and the procedure of Example 3 repeated utilizing 9 and 11% binder. The resulting paper sheets were in each case characterized by excellent color, gloss, brightness and finish and, furthermore, were characterized by exceptionally good binding strength as indicated by high Dennison wax tests. In addition, each paper which was alum treated possessed highly satisfactory wet-rub resistance. The results of the tests are set forth in the table.

EXAMPLE 5

The procedure of Example 1 was utilized to prepare a copolymer compound from 6% acrylic acid and 94% acrylamide. This copolymer was utilized to prepare a coating color composition which in turn was coated on paper to yield a highly satisfactory coated paper. The paper compared favorably with the products of Examples 1 to 4 in color, brightness, gloss, and finish and, when alum treated, had satisfactory wet-rub resistance.

The new coating color composition according to this invention comprises an aqueous mixture of a pigment or a clay slip with a binding material such as described in the examples, the binding material being a vinyl-type copolymer prepared from a minor but significant proportion of acrylic acid; namely, a copolymer containing from about 3 to about 30% and preferably from about 6 to about 10% acrylic acid together with a compatible copolymerizable monomer such as, for example, the corresponding amide, nitrile or the like. Thus, satisfactory copolymers may be prepared utilizing between about 3 and about 30% and preferably between about 6 and about 10% acrylic acid and the remainder acrylamide and the resulting copolymer employed in the preparation of a coating color.

In the selection of the desired proportions of ingredients for the preparation of the copolymer, the desired properties of the final coated paper should preferably be taken into consideration. Thus, an increasing amount of the acrylic acid and the comonomer adds a progressively increasing degree of insolubilization to the final coating with the result that a composition containing about 3% acrylic acid may be given a moderate degree of insolubilization and a composition containing an increasingly large percentage of the acrylic acid can be increasingly more insolubilized. In this manner a copolymer prepared from about 15 to about 30% of the acrylic acid may be very highly insolubilized. However, when it is desired to prepare a coating composition with emphasis on high adhesive strength as distinguished from emphasis on wet-rub resistance, a somewhat lower percentage of acrylic acid is to be preferred and, in general, a proportion of less than 10% acrylic acid in the copolymer yields a coating color which, when prepared under comparable conditions, has a somewhat greater ad-

Table

| Copolymer composition | Percent binder based on clay | Color solids (percent) | Operational detail | Dennison wax test | Wet-rub resistance |
|---|---|---|---|---|---|
| 90% acrylamide<br>10% acrylic acid | 9.0 | 62.4 | | 5+ | |
| 90% acrylamide<br>10% acrylic acid | 9.0 | 62.4 | Alumed sheets | 6 | Fair. |
| 90% acrylamide<br>10% acrylic acid | 11.0 | 60.0 | | 5+ | |
| 90% acrylamide<br>10% acrylic acid | 11.0 | 60.0 | Alumed sheets | 7+ | Fair. |
| 84% acrylamide<br>16% acrylic acid | 7.0 | 54.0 | | 2+ | |
| 84% acrylamide<br>16% acrylic acid | 7.0 | 54.0 | Alumed sheets | 4+ | Good. |
| 84% acrylamide<br>16% acrylic acid | 9.0 | 52.0 | | 4 | |
| 84% acrylamide<br>16% acrylic acid | 9.0 | 52.0 | Alumed sheets | 6 | Good. |
| 84% acrylamide<br>16% acrylic acid | 11.0 | 54.0 | | 6− | |
| 84% acrylamide<br>16% acrylic acid | 11.0 | 54.0 | Alumed sheets | 8 | Excellent. |
| Control (starch) | 18.0 | 42 | | <2 | Poor. |
| Do | 18.0 | 42 | Alumed sheets | <2 | Do. | hesive or binding strength. In the preparation of a coating composition for general purposes, a preferred balance of properties is obtained utilizing the acrylic acid in the preferred range of between about 6 and about 10%, based on the total weight of the copolymer.

For optimum results in the coating of paper, it is preferred to prepare a coating color having a total solids composition which is relatively high, thus providing good surface coating qualities and economical operation. A preferred range of total solids for the coating color is between about 30 and 70% solids with an optimum value at about 50–65%. The amount of the binder in the coating color is maintained between about 5 and about 15%, based on the weight of clay, and preferably between about 6 and about 10%. A composition containing an amount of total solids and binder in this range is characterized by being readily applied to the surface of the paper and by forming a highly resistant coating thereon. Utilizing the coating color according to this invention, there is produced a coated paper with highly satisfactory primary qualities such as color, brightness, smoothness, gloss, and the like, and which is highly satisfactory for use in printing operations and is resistant to disturbance of the clay coating surface through rubbing, picking, and the like.

In a preferred embodiment of this invention, the paper which has been coated by means of the coating color described herein is subjected to a further treatment causing the binder to become insolublized and, accordingly, more resistant to the effects of water and the like. Thus, the binding composition containing a copolymer having a small but significant number of free acid groups in its structure was treated with an insolubilizing agent such as, for example, a polyvalent metallic salt including salts of such various metals as aluminum, calcium, magnesium, and the like, thereby rendering the coating highly insoluble and strongly adhesive.

The preferred procedure for insolubilizing the coating for the preparation of a high wet-rub resistance coating comprises treating the freshly coated paper with a solution containing between about 0.1 and about 5% and preferably between about 1 and about 3% alum in aqueous solution. This alum solution may be used to treat the paper by any desired method such as spraying, coating, dipping, brushing, or the like, and for the purposes of illustration and comparison the examples have shown a typical one of these procedures; namely, dipping the freshly coated paper in an aqueous alum solution.

The pigment material which is utilized in the coating color comprises one of the conventional paper coating materials such as, for example, a pulverized clay or the like. For higher quality or special types of paper there may be substituted therefor other known pigment materials such as, for example, calcium sulfate, titanium dioxide, satin white or other coating pigments alone, or preferably with a clay base. The modification of the coating color using these materials will be within the knowledge of those skilled in the art and it is to be understood that the pigment material as contemplated herein includes any or all of these materials.

The utility of applicant's invention is not limited to the particular type of paper pulp used, and, accordingly applicant's invention may be utilized with the various types of kraft, soda, sulfite pulp, and the like as well as with various other chemical and semichemical paper pulps.

By the same token, the invention may be utilized with various types of paper products such as paper, fiber board, molded pulp products, and the like. In all instances, the product produced by applicant's invention is characterized by being relatively resistant to abrasion and by having a surface of fine quality and improved printing properties.

What I claim and desire to protect by Letters Patent is:

1. The method of producing coated paper of the type having a base and a printing surface consisting of a continuous film of pigment interspersed in binder by means of which the filler is retained on the base which comprises completely covering a face of a paper web with a continuous viscous coating consisting essentially of a pigment dispersed in an aqueous solution of a binder consisting essentially of a copolymer of acrylic acid and a compound of the group consisting of acrylamide and acrylonitrile, and drying the coated paper web, the acrylic acid content of the copolymer being from 3% to 30%, said copolymer being soluble in water at room temperature.

2. The method of producing coated paper of the type having a base and a printing surface consisting of a continuous film of pigment interspersed in binder by means of which the filler is retained on the base which comprises completely covering a face of a paper web with a continuous viscous coating consisting essentially of a pigment dispersed in an aqueous solution of a binder consisting essentially of a copolymer of acrylic acid and acrylamide, and drying the coated paper web, the acrylic acid content of the copolymer being from 3% to 30%, the total solids content of the coating as applied being from 30% to 70%, the copolymer content of the coating as applied being from 5% to 15% based on the pigment, said copolymer being soluble in water at room temperature.

3. The method of producing coated paper of the type having a base and a printing surface consisting of a continuous film of pigment interspersed in binder by means of which the filler is retained on the base which comprises completely covering a face of a paper web with a continuous viscous coating consisting essentially of a pigment dispersed in an aqueous solution of a binder consisting essentially of a copolymer of acrylic acid and acrylamide, and drying the coated paper web, the acrylic acid content of the copolymer being from 6% to 10%, the total solids content of the coating as applied being from 50% to 65%, the copolymer content of the coating as applied being from 6% to 10% based on the pigment, said copolymer being soluble in water at room temperature.

4. The method of producing coated paper of the type having a base and a printing surface consisting of a continuous film of pigment interspersed in binder by means of which the filler is retained on the base which comprises completely covering a face of a paper web with a continuous viscous coating consisting essentially of a pigment dispersed in an aqueous solution of a binder consisting essentially of a copolymer of acrylic acid and acrylamide, treating the coated paper web with an aqueous solution of an insolubilizing agent to render the binder substantially insoluble in water, and drying the coated paper web, the acrylic acid content of the copolymer being from 6% to 10%, the total solids content of the coating as applied being from 50% to 65%, the copolymer content of the coating as applied being from 6% to 10% based on the pigment, said copolymer being soluble in water at room temperature.

5. The method of producing coated paper of the type having a base and a printing surface consisting of a continuous film of pigment interspersed in binder by means of which the filler is retained on the base which comprises completely covering a face of a paper web with a continuous viscous coating consisting essentially of a pigment dispersed in an aqueous solution of a binder consisting essentially of a copolymer of acrylic acid and acrylamide, treating the coated paper web with an aqueous solution of a polyvalent metal salt to insolubilize the binder, and drying the coated paper web, the acrylic acid content of the copolymer being from 6% to 10%, the total solids content of the coating as applied being from 50% to 65%, the copolymer content of the coating as applied being from 6% to 10% based on the pigment, said copolymer being soluble in water at room temperature.

6. The method of producing coated paper of the type having a base and a printing surface consisting of a continuous film of pigment interspersed in binder by means of which the filler is retained on the base which comprises completely covering a face of a paper web with a continuous viscous coating consisting essentially of a pigment dispersed in an aqueous solution of a binder consisting essentially of a copolymer of acrylic acid and acrylamide, treating the coated paper web with an aqueous solution containing from 0.1% to 5% alum to insolubilize the binder, and drying the coated paper web, the acrylic acid content of the copolymer being from 6% to 10%, the total solids content of the coating as applied being from 50% to 65%, the copolymer content of the coating as applied being from 6% to 10% based on the pigment, said copolymer being soluble in water at room temperature.

7. A coated paper having a base and a printing surface consisting of a continuous flexible film adapted to receive printing overlying and completely covering the entire face of said base, said film consisting essentially of filler and binder in which said filler is interspersed and which binds said filler to said base, said binder consisting essentially of a copolymer of acrylic acid and a compound of the group consisting of acrylamide and acrylonitrile, the acrylic acid content of the copolymer being from 3% to 30%, said copolymer being soluble in water at room temperature.

8. A coated paper having a base and a printing surface consisting of a continuous flexible film adapted to receive printing overlying and completely covering the entire face of said base, said film consisting essentially of filler and binder in which said filler is interspersed and which binds said filler to said base, said binder consisting essentially of a copolymer of acrylic acid and acrylamide, the acrylic acid content of the copolymer being from 3% to 30%, said copolymer being soluble in water at room temperature.

9. A coated paper having a base and a printing surface consisting of a continuous flexible film adapted to receive printing overlying and completely covering the entire face of said base, said film consisting essentially of filler and binder in which said filler is interspersed and which binds said filler to said base, said binder consisting essentially of a copolymer of acrylic acid and acrylamide, the acrylic acid content of the copolymer being from 6% to 10%, said copolymer being soluble in water at room temperature.

10. A coated paper having a base and a printing surface consisting of a continuous flexible film adapted to receive printing overlying and completely covering the entire face of said base, said film consisting essentially of filler and binder in which said filler is interspersed and which binds said filler to said base, said binder consisting essentially of a copolymer of acrylic acid and acrylamide, the acrylic acid content of the copolymer being from 3% to 30%, the copolymer being present in the film in the amount of 5% to 15% based on the pigment, said copolymer being soluble in water at room temperature.

11. A coated paper having a base and a printing surface consisting of a continuous flexible film adapted to receive printing overlying and completely covering the entire face of said base, said film consisting essentially of filler and binder in which said filler is interspersed and which binds said filler to said base, said binder consisting essentially of a copolymer of acrylic acid and acrylamide, the acrylic acid content of the copolymer being from 3% to 30%, the copolymer being present in the film in the amount of 6% to 10% based on the pigment, said copolymer being soluble in water at room temperature.

JULIAN L. AZORLOSA.

References Cited in the file of this patent

UNITED STATES PATENTS

| Number | Name | Date |
| --- | --- | --- |
| 1,976,679 | Fikentscher | Oct. 9, 1934 |
| 2,147,154 | Fikentscher | Feb. 14, 1939 |
| 2,251,296 | Shipp | Aug. 5, 1941 |
| 2,287,161 | Ball | June 23, 1942 |
| 2,343,095 | Smith | Feb. 29, 1944 |
| 2,419,880 | Blyler | Apr. 29, 1947 |
| 2,476,527 | Barnes | July 19, 1949 |

OTHER REFERENCES

Ser. No. 397,138, Fikentscher (A. P. C.), published May 11, 1943.